(12) United States Patent
Quesnel

(10) Patent No.: US 8,653,366 B2
(45) Date of Patent: Feb. 18, 2014

(54) IMPLOSIVE JOINT AND DEAD-END APPARATUS AND METHOD

(75) Inventor: Wayne L. Quesnel, Spartanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 658 days.

(21) Appl. No.: 12/531,810

(22) PCT Filed: Apr. 16, 2009

(86) PCT No.: PCT/US2009/040812
§ 371 (c)(1),
(2), (4) Date: Sep. 17, 2009

(87) PCT Pub. No.: WO2009/129392
PCT Pub. Date: Oct. 22, 2009

(65) Prior Publication Data
US 2011/0297441 A1    Dec. 8, 2011

Related U.S. Application Data

(60) Provisional application No. 61/045,312, filed on Apr. 16, 2008.

(51) Int. Cl.
*H02G 15/00* (2006.01)

(52) U.S. Cl.
USPC .................................................. 174/74 R

(58) Field of Classification Search
USPC .......................... 174/74 R, 88 R, 93
See application file for complete search history.

(56) References Cited

U.S. PATENT DOCUMENTS

| | | | | |
|---|---|---|---|---|
| 3,668,778 | A * | 6/1972 | Lindtveit et al. | 29/882 |
| 3,670,090 | A | 6/1972 | Osteng | |
| 3,684,820 | A * | 8/1972 | Johnsen | 174/90 |
| 4,722,590 | A * | 2/1988 | Thomas | 385/107 |
| 5,162,617 | A * | 11/1992 | Ferbas | 174/138 F |
| 5,777,262 | A | 7/1998 | Nourai et al. | |
| 7,219,425 | B2 | 5/2007 | Pasini | |

* cited by examiner

*Primary Examiner* — Chau Nguyen
(74) *Attorney, Agent, or Firm* — Sughrue Mion, PLLC

(57) ABSTRACT

A method of fusing cables and a dead end assembly and a cable are provided. A joint assembly for fusing cables and a dead end fusing assembly for fusing a cable and a forge assembly are provided. The method includes cutting back strands of a cable, exposing the core; inserting the core of cables into a core grip; positioning the joint assembly over the core grip within certain marked sections of the cables; wrapping the joint assembly with one wrap of detonation cord; securing a detonator to the detonation cord explosive charge and detonating the detonator, such that the core grip fuses the cables together.

14 Claims, 16 Drawing Sheets

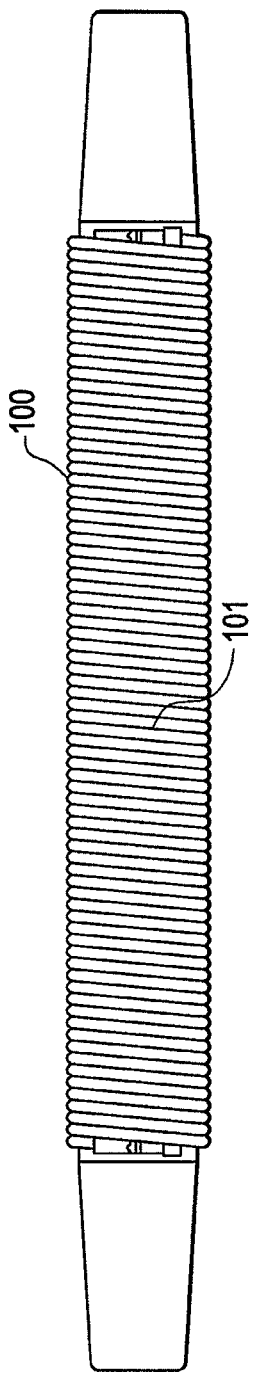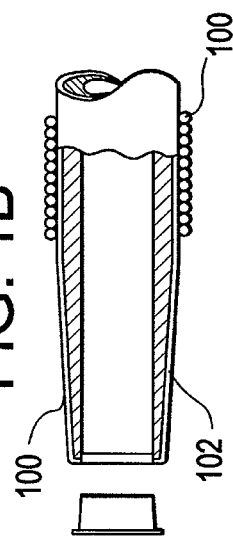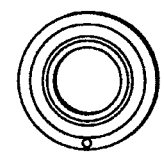

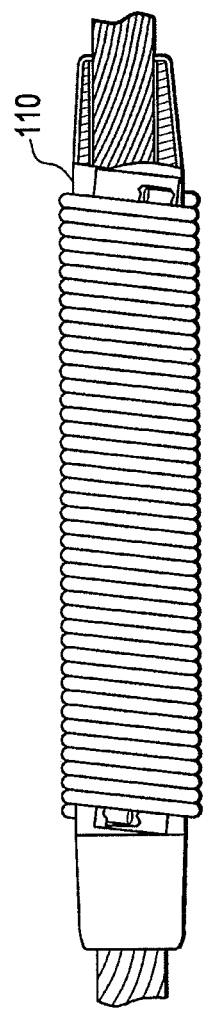
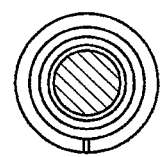
FIG. 11A
FIG. 11B

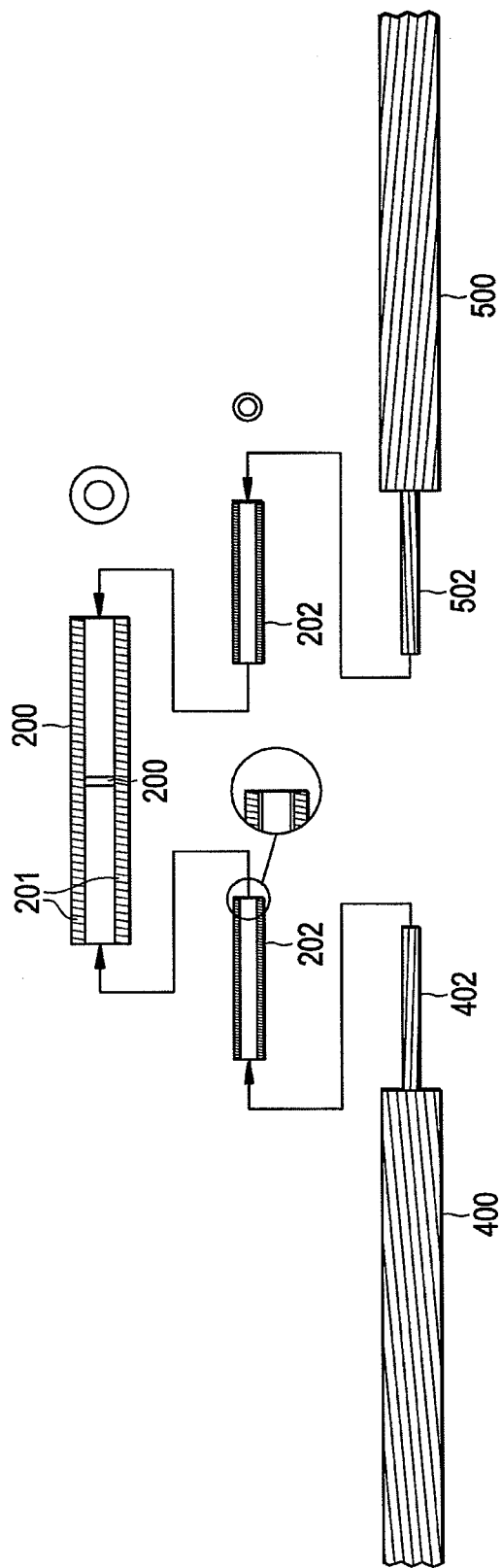

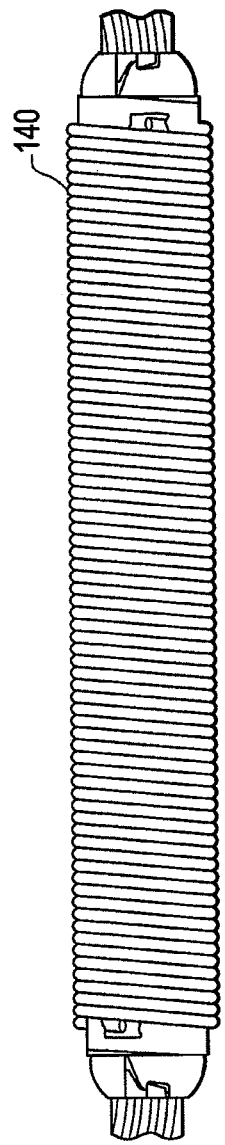
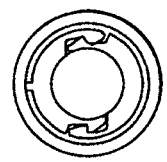
FIG. 14A
FIG. 14B

IMPLOSIVE JOINT AND DEAD-END APPARATUS AND METHOD

This application claims priority from U.S. Provisional Application No. 61/045,312 filed on Apr. 16, 2008, the disclosure of which is incorporated herein by reference.

BACKGROUND OF THE INVENTION

1. Field of the Invention

Apparatuses and methods consistent with the present invention relate to an implosive joint and dead end apparatus, and to methods for fusing cables together, and a dead end and a cable together, using an implosive joint apparatus.

2. Description of the Related Art

In connection with heavy gauge wires, which may be disposed in positions which are difficult to reach, commensurately high powered tools are required to make pressure connections between said wires. In view of the weight and bulk of the tools it may be inconvenient or impossible to carry such tools to the sites at which the joining is to be made.

It has previously been proposed to connect ends of wires and the like by inserting the ends into a corresponding bore of a connecting member provided with an external layer of explosive, which during detonation, compresses the connecting member around the ends. The layer of explosive used had, however, an even cross-section along the whole length thereof in order to produce an even radial compression of the connecting member.

In connection with high tension lines, supporting cables and the like, which are subjected to heavy stresses, it is of great importance to obtain a permanent, tight clamping effect of the connecting member to ensure that no relative sliding movement may occur between the member and the ends connected thereby.

Thus, such connectors, herein termed implosive connectors, have been used in high energy metalworking to replace conventional hydraulic compression fittings for high voltage transmission lines. A small charge, engineered for each connector, supplies the energy to complete the installation in $1/10,000$ of a second, replacing the work of a 60 to 100 ton press. Such implosive connectors are completely metallic fitting and result in a void free, uniformly smooth and straight connector.

In more detail, generally, implosive connectors comprise a conductor splice consisting of an outer aluminum sleeve equipped with a pre-mounted implosive charge, and filler, preferably, optionally, an inner steel sleeve having an aluminum tube on the outside.

One example of the related art is U.S. Pat. No. 7,219,425 to Pasini, which describes a method of joining two interfacing ends of cables, one to another, where each end is enlarged using a metallic pin to facilitate a greater compaction force. The disadvantage with this patent is that the steel pin creates a larger diameter at the end of the cable, causing surface irregularities to be increased.

However, there remains a need for a method of joining ends of wires and the like which is lighter, cheaper, quicker and easier to install while providing at least an acceptable efficacious permanent join of the wires. Further, there remains a need to create a smoother outside surface, allow for less irregularities, reduce manufacturing costs and for reduction in loosening of conductor strands after detonation.

SUMMARY OF THE INVENTION

The present invention provides an implosive joint apparatus and a method for fusing conductor cables together and for fusing a dead end and cable together. Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

According to an aspect of the present invention, there is provided a method for fusing a first cable and a second cable, including, inserting ends of the cables into a connecting tube so that the ends of the cables abut each other, positioning a joint over the connecting tube, providing the joint with an outer layer of explosive charge, and detonating the layer of implosive charge, where the connecting tube includes an inner sleeve, whose bore is coated with grit particles, and an outer sleeve.

The joint may be an aluminum joint. The cable may be a conductor with a plurality of conductor strands, which are tightly packed steel strands, enclosed by tightly packed aluminum strands. The core of the connecting tube may be a steel core, and the outer and inner sleeve may be made of aluminum. Fusing the cable may also include removing part of the first cable and the second cable at the cables' ends. The grit particles may be composed of silicon carbide grit. Also, a surface protection interface may be provided between the joint and the implosive charge.

According to another aspect of the present invention, there is provided a method for fusing a cable and a dead end assembly, including inserting an end of the cable end and the dead end assembly into a connecting tube such that the cable end and dead end assembly abut each other, providing the joint with an outer layer of implosive charge; and detonating the implosive charge so as to compress the connecting tube around cable and the dead end assembly, where the connecting tube may include an inner sleeve, whose bore is coated with grit particles to provide a strengthened grip, and an outer sleeve.

The dead end assembly may be an aluminum assembly. The cable may be a conductor comprising a plurality of conductor strands, which are tightly packed steel strands, enclosed by tightly packed aluminum strands. The core of the connecting tube may be a steel core, and the outer and inner sleeve may be comprised of aluminum. Fusing the cable and the forged dead end assembly may also include removing part of the cable at the cable's end. The grit particles may be comprises of silicon carbide grit.

Also, a surface protection interface may be provided between the joint and the implosive charge.

According to another aspect of the present invention, there is provided a forged dead end assembly including an end portion and a cylindrical body with a first body portion and a second body portion where the second body portion has a radius smaller than the first body portion.

The forged dead end assembly may also have an end portion containing an eye hole. Also, the forged dead end assembly may be comprised of aluminum.

According to another aspect of the present invention, there is provided an implosive joint apparatus for fusing cables including a core grip, and a sleeve with an implosive charge, where the sleeve has a bored hole, and the core grip has an outer layer, and an inner layer whose bore is coated with grit particles.

The sleeve may be an aluminum sleeve and may further include end caps to maintain a clean bore.

The inner and outer sleeve of the core grip may be comprised of aluminum. The grit particles may comprise silicon carbide grit to provide a strengthened grip to hold the steel core. The implosive joint apparatus may also include a surface protection interface between the sleeve and the implosive charge.

According to another aspect of the present invention, there is provide a dead end fusing apparatus including a core grip, a forged dead end assembly, and a sleeve with an implosive charge where the sleeve has a bored hole with the forged part inserted partly therein, the sleeve houses the core grip, the sleeve is wrapped in the implosive charge, and the core grip has an outer layer, and an inner layer whose bore is coated with grit particles.

The dead end fusing apparatus may have the sleeve as an aluminum sleeve, which includes an end cap to maintain a clean bore.

The core grip of the dead end fusing apparatus may have an inner and outer sleeve which are made of aluminum. The grit particles may be silicon carbide grit to provide a strengthened grip to hold the steel core. The dead end fusing apparatus may also include a surface protection interface between the sleeve and the implosive charge.

Fusing the cable may also include positioning the joint over the connecting tube such that the joint is within marked sections of the first and second cables.

The dead end fusing apparatus may further include inserting a cable into the core grip, and inserting the forged dead end assembly into the core grip, allowing the dead end fusing apparatus to slide over the core grip, and to detonate the implosive charge, fusing the cable and the dead end.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 1 is a detailed diagram of a joint assembly according to an exemplary embodiment of the present invention. FIG. 1(*a*) is a diagram of the outer sleeve. FIG. 1(*b*) is a diagram of the end view of the joint assembly. FIG. 1(*c*) is another end view of the joint assembly.

FIG. 2(*b*) is a diagram of the end view of the joint assembly.

FIG. 9(*b*) is a diagram of a side view of the dead-end assembly and a conductor in the core grip.

FIG. 10(*b*) is an end view of the joint assembly.

FIG. 11(*a*) is a diagram of a jumper connector, in an exemplary embodiment. FIG. 11(*b*) is a diagram of an end view of the jumper connector.

FIG. 12(*b*) is an end view of the terminal assembly.

FIG. 13 is another detailed diagram of the joint parts and the core-grip assembly.

FIG. 14(*a*) is a detailed diagram of a repair sleeve assembly. FIG. 14(*b*) is a detailed diagram of a cross-section of the repair sleeve assembly.

FIG. 15(*b*) is a detailed diagram of an end view of the tee tap assembly.

DETAILED DESCRIPTION OF THE EXEMPLARY EMBODIMENTS

Figure 2A:
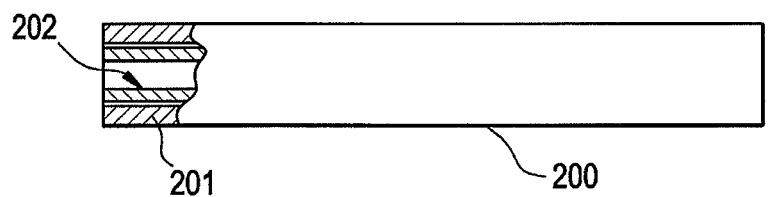
FIG. 2(*a*) is a detailed diagram of and a core grip assembly according to an exemplary embodiment of the present invention.

Certain exemplary embodiments of the present invention will now be described in greater detail with reference to the accompanying drawings.

In the following description, all elements retain their drawing reference numerals throughout the drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1(*a*) is a diagram of the joint assembly 100 according to an exemplary embodiment of the present invention. FIG. 1(*b*) is a detailed diagram of a cross section of the joint assembly, showing the joint body and the surface protection interface 102. FIG. 1(*c*) is an end view of the joint assembly showing the various layers. In this embodiment, the joint assembly is an aluminum sleeve with 80 wraps of one detonation cord 101 wrapped around it in one layer, where the aluminum sleeve is tubular aluminum with tapered ends. However, there may be more or less than 80 wraps, and this is just one example configuration.

An exemplary embodiment of the present invention shows that the joint assembly is 24.31 inches long, with the length of the wrapped detonation cord being 16.4 inches long. The diameter of the joint assembly 100 with the detonation cord 101 is 2.44 inches, and 1.59 inches at the tapered ends. However, these figures are variable and are only representative of one of the exemplary embodiments of the present invention.

The joint assembly body may be wrapped with a surface protection layer 102, which, in an exemplary embodiment, is a heat shrinkable tubing interface of InsulTob, HS-105 Clear, for surface protection from the blast. The detonation cord 101 individually has a diameter of 0.205 inches, and is PETN explosive, with a weight of 50 grains per foot. The total explosive on the joint assembly 100 is 2,290.5 grams. However, these figures are variable and are only representative of one of the exemplary embodiments of the present invention.

Figure 2B:
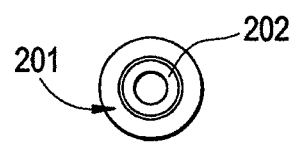

The core grip assembly 200 in FIG. 2(*a*) comprises two aluminum sleeves, and outer sleeve 201 and an inner sleeve 202. FIG. 2(*b*) shows an end view of the core grip assembly 200. The inner sleeve 202 is coated with grit particles, although other substances which increase gripping may be used. The core grip, in an exemplary embodiment, has a 1.000 inch diameter of the outer sleeve, and a 0.328 drill through diameter.

Figure 3:
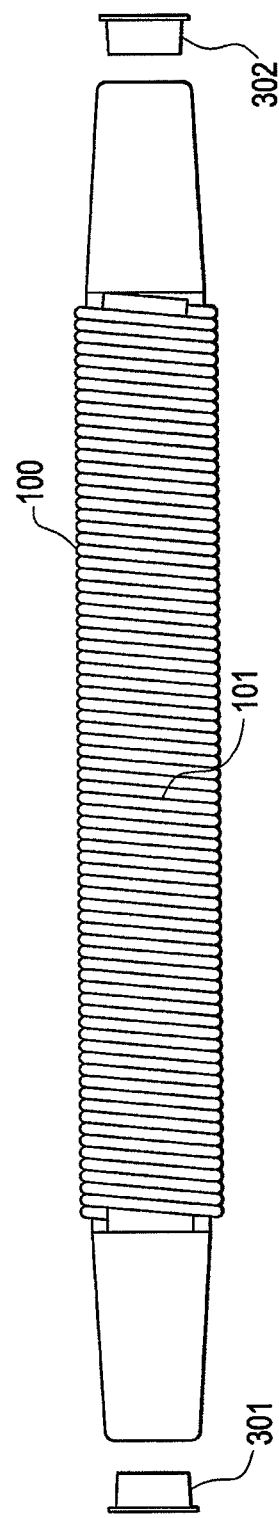
FIG. 3 is a diagram of the joint assembly with end caps according to an exemplary embodiment of the present invention.

FIG. 3 illustrates end caps 301 that may be used to ensure the joint assembly's 100 bore remains clean.

Figure 4:
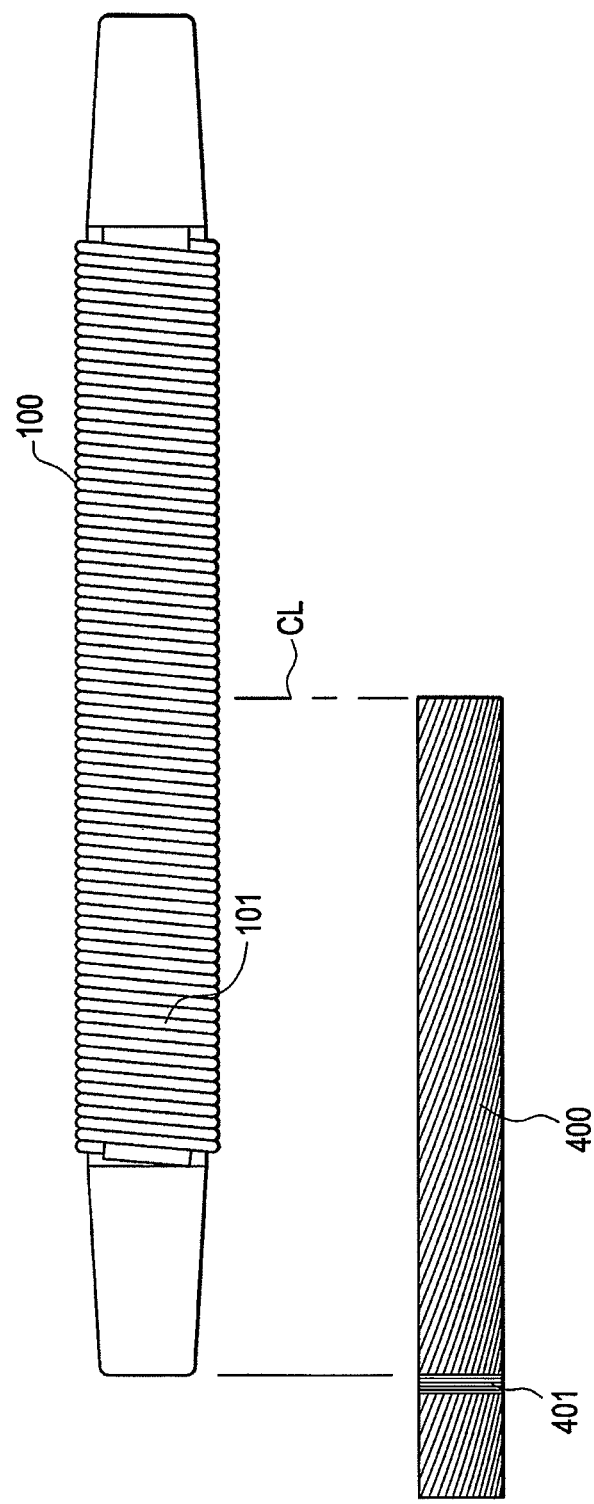
FIG. 4 is a diagram of the conductor with a marked section.

In FIG. 4, a conductor 400 is marked at line 401, half the length of the joint assembly. Marked line 401 indicates where the joint assembly should be positioned with respect to the conductor 400.

Figure 5:
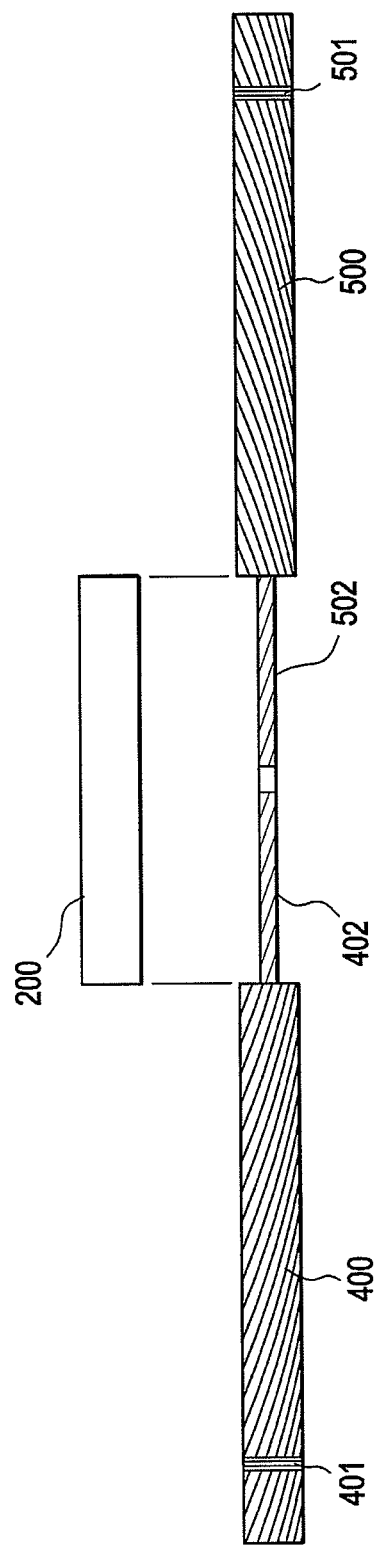
FIG. 5 is a diagram of the conductor with its aluminum strands cut back.

In FIG. 5, the conductor strands are pulled back revealing a core area of the conductors 400 and 500, sections 402 and 502. According to an exemplary embodiment, the aluminum strands are cut back half the length of the core grip assembly as shown in FIG. 5 and the conductors are inserted into the core grip, such that the conductor ends abut each other. Core grip 200 is positioned to fit over the core areas 402 and 502 of the conductors.

Figure 6:
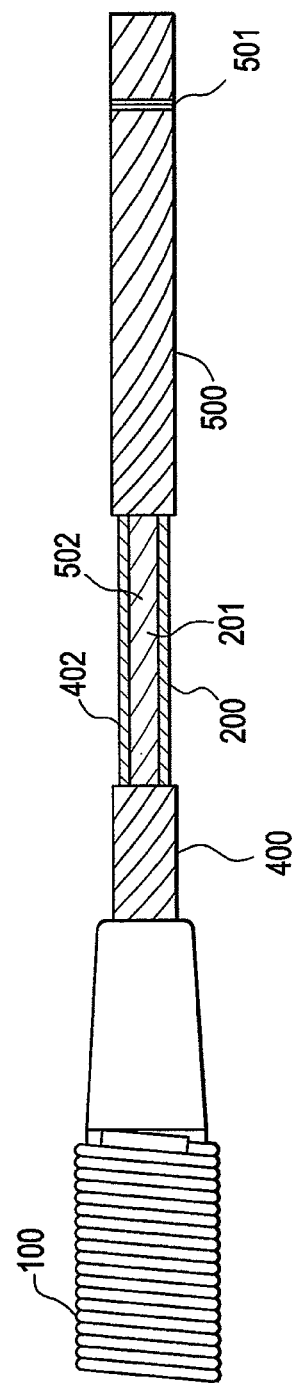
FIG. 6 is a diagram of the conductors secured by the core grip.

The joint assembly 100 is then slid over conductor 400, as shown in FIG. 6. There is a small 0.24 inch intended gap 201 between the section 402 and 502.

Figure 7:
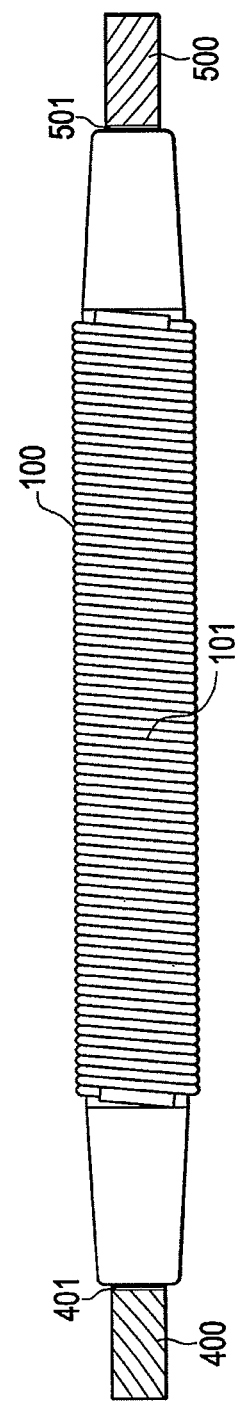
FIG. 7 is a diagram of the joint assembly secured over the core grip.
Figure 8:
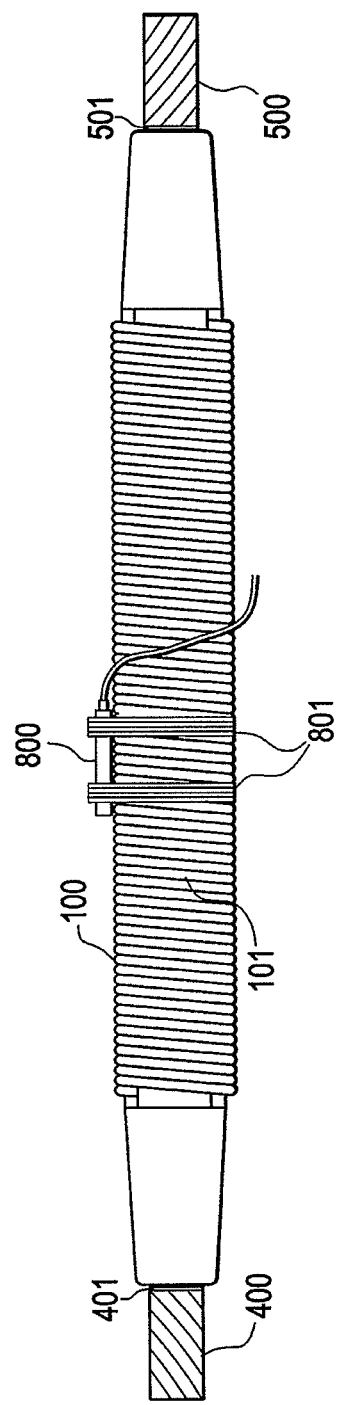
FIG. 8 is a diagram of the detonator secured to the joint assembly for fusing the cables together.

FIG. 7 shows the joint assembly 100 fully slid over the conductors 400 and 500, between the marking lines 401 and 501, such that the core grip 200 is at the center of the joint assembly 100.

A detonator 800 is attached to the joint assembly 100 using an adhesive 801, such that the detonator 800 is secured to the detonator cord 101. This detonator 800 will set off an explosive charge of the detonator cord such that the core-grip will fuse the conductor 400 section 402 and conductor 500 section 502 together, such that they are one conductor cable. An advantage of the implosion technique is that it creates a watertight compression between the core grip and the conductor.

The conductor itself comprises steel conductor core strands surrounded by aluminum strands. However, the conductor is not limited to having a steel core, and may have a ceramic core or a core made of other material which provide greater gripping strength.

Figure 9A:
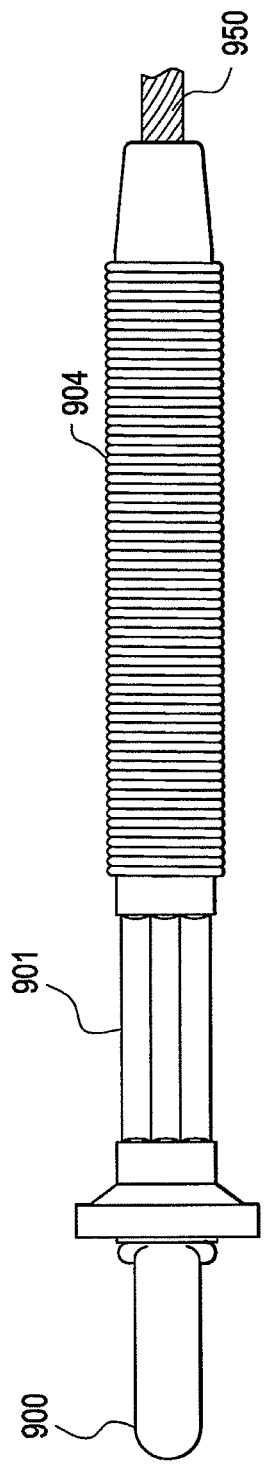
FIG. 9(*a*) is a diagram of the dead-end assembly in a top-view and a conductor in the core grip.
Figure 9B:
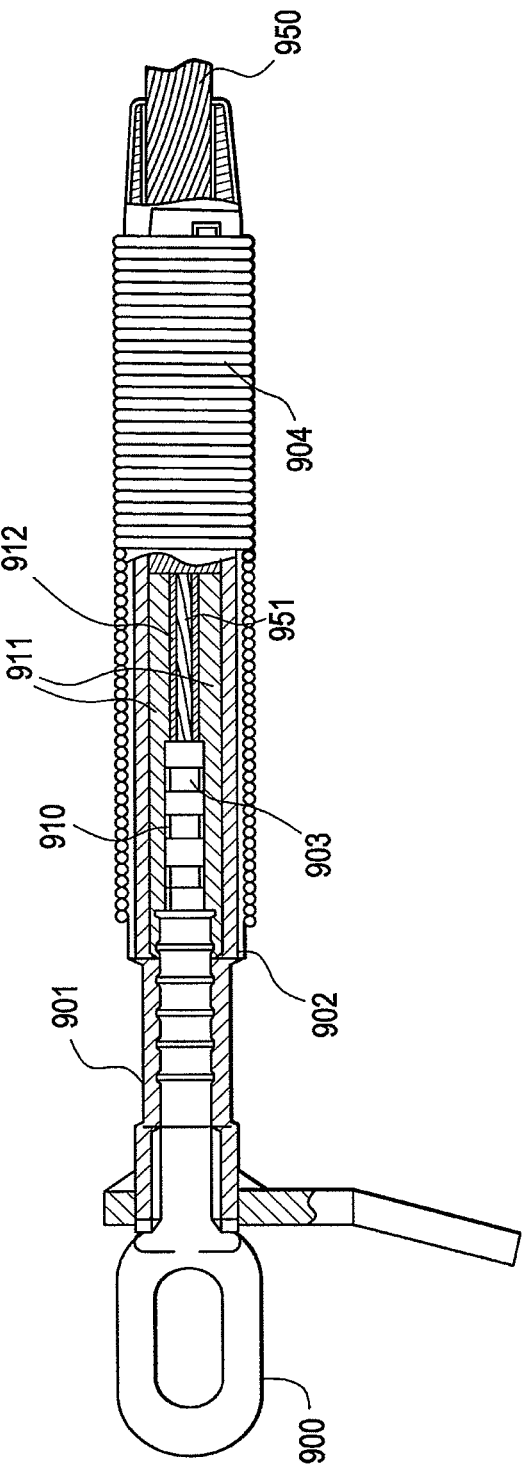
Figure 10A:
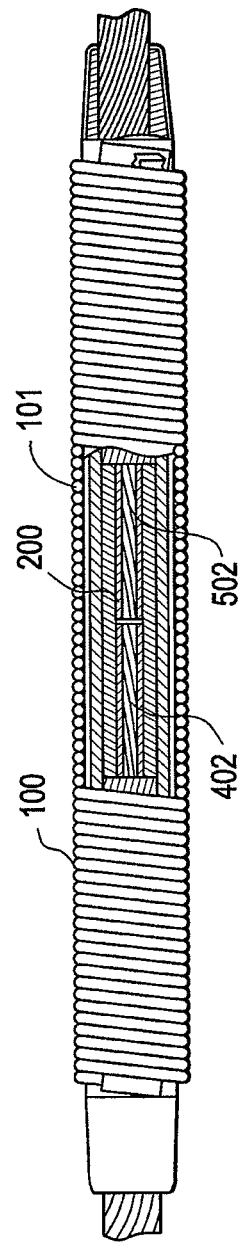
FIG. 10(*a*) is a diagram of the joint assembly with the core grip and cables inside of the assembly, showing a cut-out of all layers inside the joint assembly.
Figure 10B:
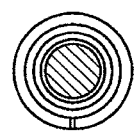

In another exemplary embodiment, a conductor end 951 and a forged dead end assembly 900 can be abutted in the core grip device, as shown in FIG. 9(a). FIG. 9(b) is an side-view of the assembly showing all of the layers.

The forged dead end assembly is comprised of and portion and a cylindrical body with a first body portion and a second body portion. The second body portion has a smaller radius that the first body portion, such that only the second body portion is inserted into the core grip.

The detonator 800 is detonated causing an implosion to occur in the joint assembly 100. The core grip outer sleeve 201 causes the steel core to fuse with both abutting conductor ends 402 and 502. The outer sleeve 201 ensures that the fused portion does not develop any surface irregularities and is smooth, and controls the shaping of inner sleeve 202. The inner sleeve 202 fuses with the conductors. Thus, a smooth fusing of the conductors, or the conductor and a dead end assembly occurs, with no bird-caging, or fringing, of the aluminum strands. A smooth surface is desired and necessary for high voltage applications. One benefit of the present invention is that it prevents against corona discharge. At high voltage, imperfections on the surface of conductors cause electricity to jump, creating an undesired plume of electricity. Further, in the present invention, the joint assembly is tapered to prevent such electrical discharge.

Only one layer of the wrap of detonation cord 101 is used in the present invention, to be wrapped around the aluminum joint assembly sleeve. This allows for a lower temperature of the outside surface after detonation such that it is warm, as opposed to extremely hot and untouchable. One advantage of the present invention is that since aluminum is used, less implosive force is required, such that only one layer of detonation cord is used. The implosion of one layer of detonation cord results in significantly less heat concentration on the surface of the joint.

The core grip, in an exemplary embodiment shown in FIG. 2, has an inner sleeve 202 and an outer sleeve 201 made of aluminum. The aluminum is easily compressible, lighter, and provides the same degree of holding strength as the existing "steel" core grip used in the current technology, but allows for greater flexibility. The inner core is lined with silicon carbide grit in an exemplary embodiment, such that the conductor core and the core grip's steel core is easily gripped by the outer aluminum sleeve 202 of the core grip. However, other gripping mechanisms can be used and the sleeves may be made of other materials with similar properties as aluminum.

The technology used in the current invention, such as the aluminum material and alloy used, is different than the current technology in the following ways. Less implosive force is required to implode the aluminum, thus manufacturing costs are significantly reduced. Further, aluminum compresses easier than steel, such that costs will be reduced.

A conductor 950 may also be fused to a forge assembly 900 using a dead end fusing assembly 901, as shown in FIG. 9, as will now be described.

The second body portion 903 of the forged dead end assembly is inserted into the core grip 910, up to a certain point, half of the length of the core grip. A cable conductor 950 is inserted into the core-grip 910 up to half the length of the core-grip 910, such that the cable part 951 end abuts the second body portion 903 of the forge part. The dead end fusing assembly 901 is then coated with a surface protection interface 902.

The core grip 910 comprises an inner sleeve 912 and an outer sleeve 911. The bore of the inner sleeve is coated with silicone carbide grit particles, allowing for better gripping of the conductor end 951. The inner sleeve 912 surrounds the conductor end 951, and the outer sleeve surrounds the forged dead end assembly second body portion, 903.

Detonation cord 904 is then wrapped around the assembly 901, and a detonator is attached. The detonator is then detonated such that the implosion causes the dead-end assembly and the cable to fuse together. The implosion vaporizes the surface protection layer 910, leaving an air gap. This air gap creates a cushion such that the surface of the assembly is protected from damage and spiking.

Figure 12A:
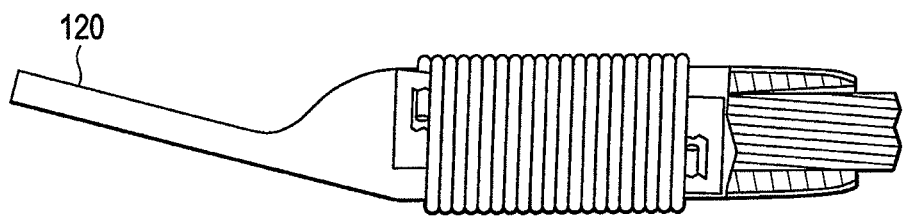
FIG. 12(*a*) is a diagram of a terminal assembly abutting a cable in a core grip.
Figure 12B:
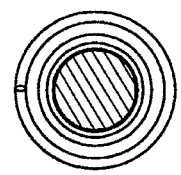
Figure 15A:
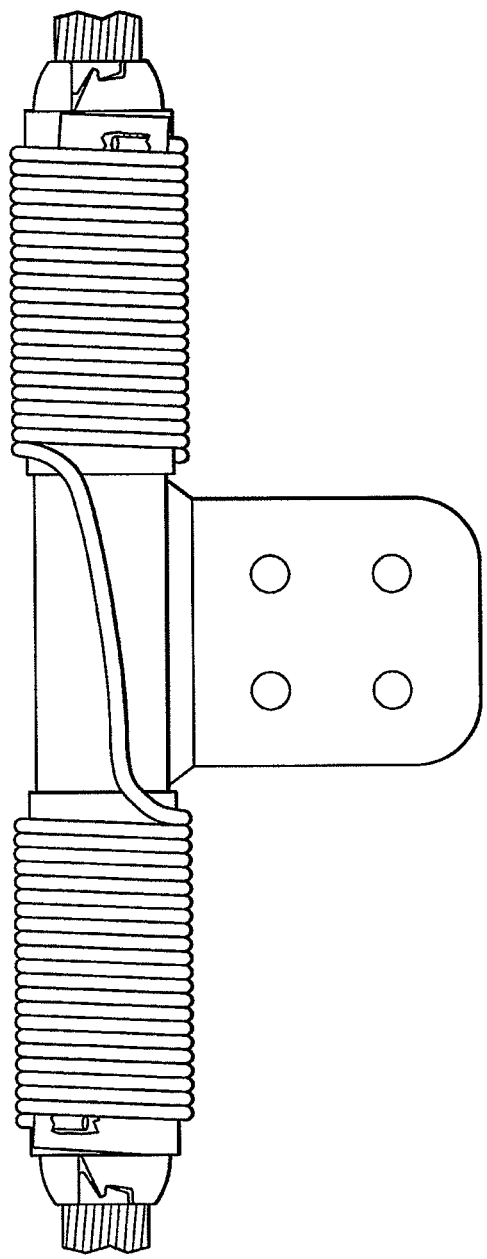
FIG. 15(*a*) is a detailed diagram of a tee tap assembly.
Figure 15B:
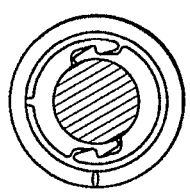
Figure 16:
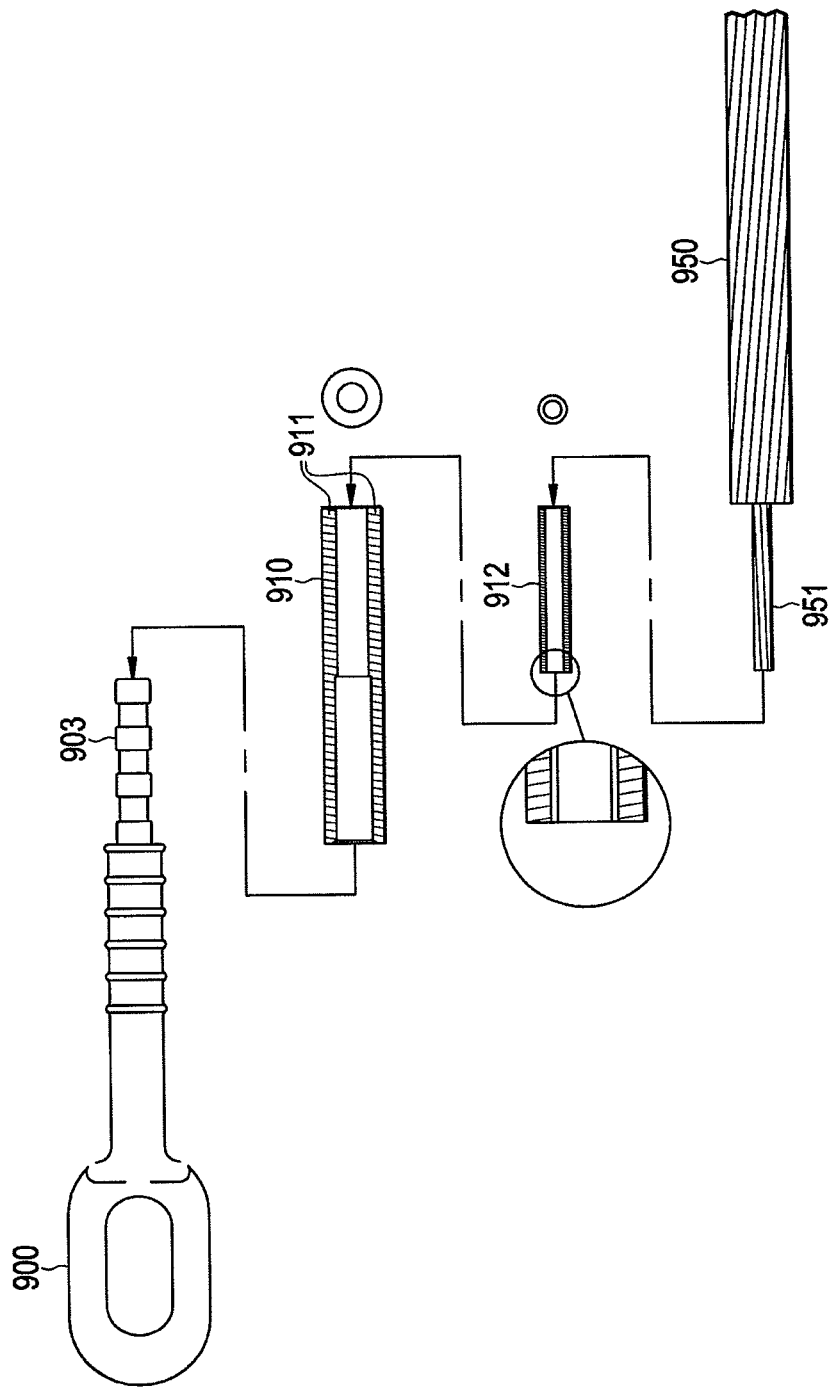
FIG. 16 is a detailed diagram of the process of joining the dead end assembly and a cable, according to an exemplary embodiment.

A jumper connector 110 can also be used to fuse conductors together, as shown in FIG. 11(a). In addition, a terminal assembly 120 can be fused to a conductor as shown in FIG. 12.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for fusing a conductor and a forged assembly, the method comprising:
   exposing a core of the conductor from the conductor by removing outer strands surrounding the core;
   sliding the exposed core into an aluminum inner half sleeve of a connecting tube, wherein the exposed core comprises a plurality of tightly packed core strands and the exposed core remains tightly packed inside the aluminum inner half sleeve;

sliding the core and the aluminum inner half sleeve into a first end of an aluminum outer sleeve of the connecting tube;

inserting the forged assembly into a second end of the aluminum outer sleeve such that the core and the forged assembly abut each other;

providing an outer body subassembly over the connecting tube, the outer body subassembly having an outer layer of implosive charge; and detonating said implosive charge so as to compress the aluminum outer sleeve of the connecting tube around the conductor and the forged assembly, wherein the aluminum inner half sleeve is coated with grit particles to provide a strengthened grip.

2. The method of claim 1, wherein the core is enclosed by tightly packed said outer strands made of aluminum.

3. The method of claim 1, wherein the tightly packed core strands are made of steel.

4. The method of claim 1, wherein the grit particles comprise silicon carbide grit.

5. The method of claim 1, wherein the method further comprises providing a surface protection interface between the outer body subassembly and the implosive charge.

6. The method of claim 1, wherein the exposed core of the tightly packed core strands has an outer diameter substantially equal to an inner diameter of the aluminum inner half sleeve.

7. The method of claim 1, wherein the sliding of the exposed core into the aluminum inner half sleeve of the connecting tube occurs before the sliding the core and the inner half sleeve into the first end of the outer sleeve of the connecting tube.

8. The method of claim 1, wherein a length of the aluminum inner half sleeve is substantially equal to a length of the exposed core.

9. A forged fusing apparatus for fusing a conductor and a forged assembly comprising:
    a core exposed from the conductor;
    a core grip comprising an aluminum inner half sleeve and an aluminum outer half sleeve,
    wherein the exposed core is disposed inside the aluminum inner half sleeve,
    wherein the exposed core comprises a plurality of tightly packed core strands and the exposed core remains tightly packed inside the aluminum inner half sleeve;
    the forged assembly; and
    an outer tube with an implosive charge;
    wherein the aluminum outer half sleeve has a bored hole with the forged assembly disposed partly therein on a first end of the aluminum outer half sleeve and the exposed core and the aluminum inner half sleeve disposed on a second end of the aluminum outer half sleeve;
    the outer tube houses the core grip; the outer tube is wrapped in an implosive charge; and the aluminum inner half sleeve is coated with grit particles.

10. The forged fusing apparatus of claim 9 wherein the outer tube further comprises an end cap at an end where the exposed core is disposed to maintain a clean bore.

11. The forged fusing apparatus of claim 9, wherein the grit particles comprise silicon carbide to provide a strengthened grip to hold the exposed core formed of steel to be inserted into the aluminum inner half sleeve.

12. The forged fusing apparatus of claim 9, further comprising a surface protection interface between the outer tube and the implosive charge.

13. The forged fusing apparatus of claim 9, wherein the exposed core of the tightly packed core strands has an outer diameter substantially equal to an inner diameter of the aluminum inner half sleeve.

14. The forged fusing apparatus of claim 9, wherein a length of the aluminum inner half sleeve is substantially equal to a length of the exposed core.

* * * * *